May 2, 1967      D. S. CARY      3,316,805
COLOR DISPLAY
Filed Sept. 2, 1965
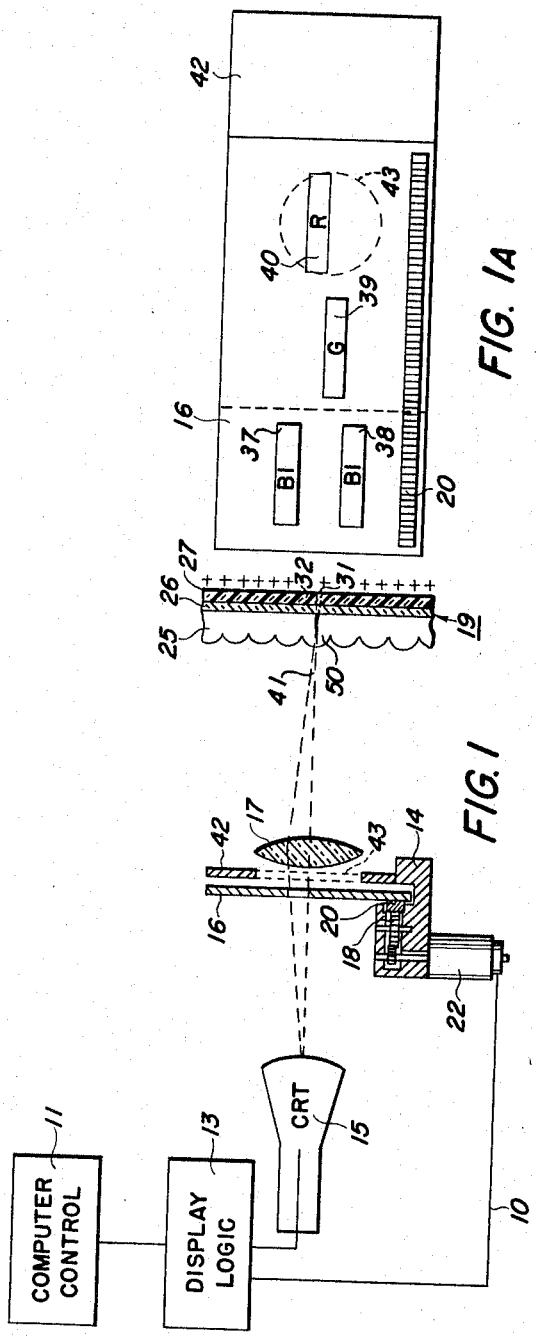
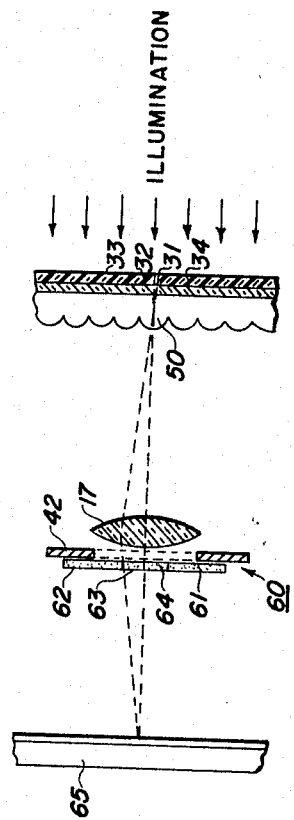
INVENTOR.
DONALD S. CARY
BY
ATTORNEYS

United States Patent Office 3,316,805
Patented May 2, 1967

---

3,316,805
COLOR DISPLAY
Donald S. Cary, Pittsford, N.Y., assignor to Xerox Corporation, Rochester, N.Y., a corporation of New York
Filed Sept. 2, 1965, Ser. No. 484,606
4 Claims. (Cl. 88—24)

This invention relates to visual presentation of graphic information, and more particularly to presentation of such information by means of multi-colored displays in which given colors consistently represent particular classes of information.

The selective use of color in a visual presentation has long been recognized as an invaluable aid for increasing comprehension and speed of recognition of the material thereby presented. In the simplest hand-drawn charts, for example, a given color will often be chosen to represent a first parameter, a second and different color for another parameter and so forth. Where such simple schemes of data presentation are involved, colors may be thus introduced with relative simplicity. But where the data to be graphically presented is highly complex, and where the nature of such data requires constantly changing displays, the introduction of color coding is not so readily achieved.

One might, for example, consider the case of an optically projected display representative of positions and directions of movement of various aircraft within an airspace. While it is common to prepare a monochromatic display of such information, it would obviously be of enormous utility to introduce into such displays various color codings to represent different classes of aircraft and/or differing directions of movement. Since, however, the type of information being considered changes almost from moment to moment, any method utilized must be capable not only of rapidly introducing the desired colored effects to begin with, but must readily lend itself as well to almost continuous updating and modification of the displayed information.

It is accordingly an object of the present incention to provide a method for converting graphic information into a visual display having color characteristics in accordance with a preselected scheme for presentation of the information.

It is another object of the present invention to provide a method for readily converting a monochromatic display of graphic information into a display colored in accordance with the type of information of which particular portions of the monochromatic display are representative.

It is a further object of the present invention to provide a method for conversion of a monochromatic display to a color display that is rapid, reliable, and simple of application.

It is yet a further object of the present invention to provide a method for conversion of monochromatic displays to full color displays, pursuant to which modification of the resulting color display is readily achieved.

Now, in accordance with the present invention, the aforementioned and other objects are achieved by the sequential presentation of differing portions of a monochromatic display to a transparent recording medium comprising generally a lenticular screen laminated to a light sensitive photoconductive layer. The sequential display of monochromatic information is registered on interlaced portions of the light sensitive medium by means of a movable aperture plate positioned at the aperture of the recording lens, the movement of this plate being coordinated with the display of successive portions of information. The photoconductive member is subsequently developed by means common to the art of xerography, but the image is in general not fixed. Projection of a light source through the imaged photoconductor and onto a screen will thereafter provide the desired full color presentation.

A fuller understanding of the present invention, of the manner in which the invention achieves the objects previously recited, and of the invention's multiple advantages as compared to the prior art, may now best be gained by a reading of the following detailed specification, and from a simultaneous examination of the drawings appended hereto in which:

FIGURE 1 diagrammatically illustrates a basic embodiment of the present invention;

FIGURE 1A is a planar view of aperture plate 16 of FIGURE 1;

FIGURE 2 diagrammatically illustrates the manner in which a projection member prepared pursuant to the present invention may be utilized for full color display.

In FIGURE 1 a monochromatic display source is illustrated as a cathode ray tube (CRT) 15. For purposes of concretely illustrating the manner in which the present invention operates, it may be assumed that the information displayed upon the face of this CRT comprises a pictorial representation of multiple aircraft operating within a geographically delimited airspace. For limited durations of time ranging in the order of seconds to minutes the visual representation will accordingly be fixed and may consist of symbolic representations for the various aircraft such as circles, crosses and the like, as well as illuminated background demarcations indicating geographical boundary lines or physical features of the terrain underlying the airspace. It may be assumed as well that differing classes of aircraft are under surveillance within the particular airspace and that it is accordingly of considerable interest to introduce into the visual display some means of differentiating between these classes. Thus, for example, a given aircraft might be considered an "enemy," a second aircraft a "friend," a third aircraft might be considered an "unknown" and so forth. Indicia may also be present in the monochromatic visual display indicating the direction of movement of the particular aircraft, such as arrows attached to the locus of the aircraft, etc.

Control of the display upon the cathode ray tube 15 initiates at the computer control 11. The latter integrates inputs from various radar tracking stations and, in turn, supplies inputs to the display logic 13 which directly controls the visual presentation. The CRT presentation is imaged by lens 17 on the light sensitive member indicated generally by the numeral 19. An aperture plate 16 is positioned in the limiting aperture of lens 17 and adjacent a fixed stop plate 42, for purposes to be explained shortly. This plate 16 is slidably mounted in a base 14, which is provided with geared means 18. The latter are operated by electrical actuator 22, which is in turn responsive to signals fed from display logic at 13. As will be demonstrated shortly, the aperture plate 16 is positioned in synchronism with the successive display of varying portions of the CRT presentation, so that the various slots within the aperture plate will act to appropriately register the several parts of the CRT image on the light sensitive member 19.

The light sensitive member 19 appearing at the right of FIGURE 1 is shown greatly enlarged in order to illustrate its structure; thus, the transparent lenticulated substrate 25 actually will have a thickness of less than 1/100 of an inch and the adjacent transparent layer 26—as well as the transparent photoconductive layer 27—will each have a thickness substantially less than the lenticulated substrate 25.

The lenticulated substrate 25 comprising the surface of light sensitive member 19 closest to lens 17 is identical with the embossed surfaces that are conventionally joined to photographic emulsions to form the well-known embossed films utilized in additive color photography. Such films, in various widths, have been available for years from the Eastman Kodak Co. of Rochester, New York. The lenticulated substrate 25 may, in fact, be conveniently derived from such films by removal therefrom of the photographic emulsion. As is well known the so-called lenticules are actually small cylindrical lenses embossed in the transparent acetate base material comprising substrate 25. These lenticules, of which there are approximately 25 per millimeter length of film, extend completely across the width of the embossed material, the action of each lenticule being such as to image the lens aperture at approximately the exposed surface of the transparent photoconductive layer 27.

Deposited upon the flat side of lenticulated substrate 25 are the successive thin layers 26 and 27. 26 and 27 together function essentially as a xerographic plate. However, in the present invention both layers must be formed of an essentially transparent material. The conductive layer 26 may by way of illustration be conveniently formed from a 200 angstrom layer of aluminum; the photoconductive layer 27 may suitably comprise a thin over-coating of an organic photoconductor such as for example, polyvinyl carbazol doped with tri-nitro fluorinone.

In the usual techniques of additive color photography utilizing embossed films, a color-banded filter is placed at the position in FIGURE 1 now accorded aperture plate 16. Although in principle only three bands are necessary—i.e. red, green and blue—for carrying out the additive process, yet it has been common to reduce vignetting problems by placing the red and green bands of the filter in the middle and splitting the blue filter into two parts placed respectively above and below the red and green bands. As will be evident from the planar view of aperture plate 16 shown in FIGURE 1A, this same principle has been followed in the placing of the aperture slots 37–40. That is to say that slots 37 and 38 nominally correspond to "blue," slot 39 to "green" and, slot 40 to "red." The sense of these designations will become apparent in what follows.

With the aid of the foregoing the operation of the system depicted in FIGURES 1 and 1A may be readily understood. Initially the light sensitive member 19 is sensitized by electrostatically charging the exposed surface of photoconductive layer 27. This step has not been illustrated but any of the conventional techniques of xerography may be used such as, for example, spray charging from a corona source. Exposure of the member to the CRT image is now initiated. As a simple illustrated of the exposure technique let us assume that the radar tracking information being fed to the computer control 11 has identified three types of aircraft within the airspace under surveillance. It is desired that the ultimate representation to a viewing audience shall show the first class of aircraft as red, the second class as green and the third class as blue. To accomplish this the signals fed by the computer 11 are so encoded to the display logic 13 that during a first period, T, the display upon the face of CRT 15—which is monochromatic—comprises only showings of the class 1 aircraft. That is to say during the period $T_1$ aperture plate 16 is so positioned that— as is seen in FIG. 1A—slot 40 therein is adjacent aperture stop 43 in stop plate 42, with a resulting open red band occurring at the otherwise occluded stop 43. During this period, $T_1$, signals are simultaneously fed via conductor 10 to the electrical actuator 22, which positions the aperture plate 16 so that only light passing through slot 40—nominally identified as red—may be imaged upon the light sensitive member 19. The light path within one particular lenticule 50 is shown at 41, the curvature of the lenticule being such that imaging of the lens aperture takes place at approximately point 31 on the charged surface of 27.

It will be readily understood by those skilled in the art that this imaging process is quite analogous to the imaging that occurs in the customary techniques of additive color photography utilizing embossed film and that the image being formed here is equivalent to that regarded in the latter technology as a "red separation" image. However, it will be carefully noted that registration on the light sensitive member has in the present instance been accomplished through the use of the aperture plate 16 and not through the use of a color banded filter. Nevertheless, once this "red separation" image is formed, its source becomes quite irrelevant.

After sufficient exposure time has transpired for adequately registering the "red separation" image, the display of type 1 aircraft is removed from the CRT face and the display of type 2 aircraft is made. During this second period, which we may regard as $T_2$, a signal conducted from the display logic 13 repositions aperture plate 16 so that slot 39—nominally identified as "green"—is adjacent stop 43 and light passing through that part of this slot aligned with stop 43 is imaged on light sensitive member 19. Though a representative light path has not been shown for this second step, it is obvious that in the case of the same lenticule 50 illustrated for light path 41, imaging will take place at a somewhat different point, here identified by point 32 on the photoconductive layer 27. This same action, integrated over the various lenticules, accordingly results in a latent green separation image interlaced with that produced during the period $T_1$.

Finally the process is repeated for a period $T_3$ during which the aperture plate 16 is positioned so that portions of the slots 37 and 38—nominally identified as "blue"—are aligned with stop 43 and light passing the two resulting open "blue" bands in the otherwise occluded stop 43 is imaged on member 19. Again in the case of lenticule 50 the imaging process will be such that registration of light passing through these slots will occur at approximately points 33 and 34; and once again considering the integral action of the multiple lenticules, a latent blue separation image is formed, interlaced with the green and red separation images previously formed.

By means of the successive imaging through the aperture plate 16 a latent electrostatic image comprising an interlaced pattern of the "red," "blue" and "green" separation images is now present on member 19 and may be developed by any of the conventional techniques of xerography. In general such techniques comprise the application of particulate material to the latent electrostatic image whereby adhesion occurs in the areas of high electrostatic intensity. In the case illustrated a positive image will accordingly result, that is to say those points at which light has struck the photosensitive surface will be represented by clear areas in the developed member. Whereas in the customery technique of xerography the developed image is fixed—usually by a process of heat fusing—for present purposes it may be desirable that the image not be fixed. The reason for this is that the developed image is not of permanent interest. On the contrary, the developed image will subsequently be displayed for but a brief period, after which a new display will be formed to illustrate the rapidly changing positions of the several aircraft. By not fixing the developed image one is enabled to rapidly wipe away the image by brushing or the like, and thus reuse the same member for successive preparation of displays.

The developed interlaced image formed upon the photoconductive layer 28 is, for viewing purposes, quite equivalent to that obtained through use of an embossed photographic film. Optical display of the developed image is, as shown in FIGURE 2, accomplished by essentially reversing the process by which the image was formed. The one important distinction is that the aperture plate 16 is now replaced by a banded filter 60, the position and area of such bands exactly coinciding with the open bands created by the aperture slots during the exposure process. The resulting arrangement is then essentially that which is customarily used for viewing the embossed films of additive color photography. Illumination provided from the right in the sense of the figure, passes through the transparent member 19 and is imaged upon the screen 65 by means of the lens 17. The manner in which color is now achieved is obvious. By way of example the points 33 and 34, which during the exposure process were registered by lenticule 50 at areas on the photoconductive surface nominally identified as "blue," are during the viewing process projected through points on filter 60 within the blue bands 61 and 62. Similarly point 31, initially recorded on an area nominally identified as "red," through the red band 63, and "green" point 32 is projected through the green band 64. It will, of course, be obvious to those familiar with colorimetry that any and all other colors of the spectrum may be similarly formed by suitable blending of the chosen three primaries.

While it is customary in xerographic development techniques to utilize a light absorptive toner to develop the latent electrostatic image, yet for purposes of the present application it may be desirable to utilize a relatively colorless toner exhibiting not light absorption characteristics, but rather light scattering characteristics. When the member 19 is developed with such material it still retains all the properties necessary to enable projection of the full color display. That is to say, imaged areas still remain clear in accordance with the degree of their exposure. However, non-imaged areas will now scatter light rather than absorb it. This is of considerable advantage and significance in preparing display members for use in additive color schemes such as the present. The reason for this is that the introduction of light absorbing filters such as at 60 necessitates the compensating use of high degrees of illumination for the image carrying member; but in the past the presence of light absorbing areas on such members has often created severe problems of overheating during projection of the display.

It will be appreciated by those skilled in the art that the structure of light sensitive member 19 is essentially a flexible one. Continuous lengths of such material can accordingly be formed into a web, and a continuous exposure, develop, projection cycle for such a web may readily be established.

While the present invention has been described in terms of specific embodiments thereof, it will be understood in view of the instant disclosure that numerous variations thereon and modifications thereof may now be readily devised by those skilled in the art without yet departing from the present teaching. Accordingly, the present invention is to be construed broadly and limited in scope only by the claims now appended hereto.

What is claimed is:

1. A method of transforming a monochromatic graphic display into a corresponding graphic display colored in accord with a preselected scheme comprising:
   (a) nominally identifying those portions of said monochromatic display to be imparted a particular color;
   (b) sequently displaying each of said portions for intervals of time during which the said portion is selectively imaged through those apertures of a selectable multiple aperture plate nominally color-identified with the color identification of said portion and through a lens system onto a lenticulated light sensitive member, said aperture plate and lens system being positioned with respect to said displayed portion and said lenticulated light sensitive member so that said portion is imaged at points on said light sensitive member behind individual lenticules in accordance with said color-identified apertures selected for the particular time interval;
   (c) developing said light sensitive member to form a visible image;
   (d) replacing said aperture plate by a banded color filter, said bands being colored in accord with the nominal color identification of said apertures; the space locations of said bands corresponding to the exposure location of the apertures with which the said bands are in color accord;
   (e) light projecting said image back through said lens system and said color filter and onto a viewing screen so that points on said developed image nominally identified with said particular colors are projected through bands on said filter corresponding to said colors.

2. A method according to claim 1 in which said light sensitive member includes a normally insulating photoconductor as the light reactive element thereof.

3. A method for transforming a monochromatic graphic display into a display colored in accord with a preselected scheme comprising:
   (a) nominally identifying at least one primary color with each element of the said monochromatic display;
   (b) sequentially displaying each of said groups of said elements identified with a primary color for intervals of time during which one of said groups is selectively imaged through those apertures of a selectable multiple aperture plate nominally color-identified with the color identification of said one of said groups and through a lens system onto a transparent light sensitive member, said aperture plate and lens system being positioned with respect to said displayed group and said light sensitive member so that said group is imaged at points on said light sensitive member behind individual lenticules in accordance with said color-identified apertures selected for the particular time interval;
   (c) developing said light sensitive member to form a visible image;
   (d) light projecting said developed image through a lens and a color banded filter and onto a viewing screen, the said lens system and color banded filter being so positioned that the said group images comprising said developed image are projected through bands on said filter corresponding to the nominal color identification of said group images, the group images being combined into simultaneous registration on the said viewing screen.

4. The method according to claim 3 wherein said step of developing includes bringing said light sensitive member into contact with a colorless light scattering toner.

References Cited by the Examiner

UNITED STATES PATENTS 2,382,604    8/1945    Capstaff et al. _____ 88—23
3,117,488    1/1964    Giordano _____ 95—1.7 X NORTON ANSHER, *Primary Examiner.*

JOHN M. HORAN, *Examiner.*

F. L. BRAUN, *Assistant Examiner.*